United States Patent
Motomura et al.

(10) Patent No.: US 6,456,347 B1
(45) Date of Patent: Sep. 24, 2002

(54) LIQUID CRYSTAL DISPLAY

(75) Inventors: Toshirou Motomura; Kazuyuki Hisanaga; Hiromi Fukuoka, all of Kagoshima-ken (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/299,582

(22) Filed: Apr. 27, 1999

(30) Foreign Application Priority Data

Apr. 28, 1998 (JP) .......................................... 10-118939
Aug. 31, 1998 (JP) .......................................... 10-244245

(51) Int. Cl.[7] ...................... G02F 1/1335; G02F 1/1336
(52) U.S. Cl. ...................................... 349/117; 349/113
(58) Field of Search ........................ 349/64, 87, 96, 349/112, 114, 176, 186, 121, 117, 113, 119, 99

(56) References Cited

U.S. PATENT DOCUMENTS

| 5,619,356 A | * | 4/1997 | Kozo .......................... 349/99 |
| 5,818,554 A | * | 10/1998 | Hiamara et al. .............. 349/67 |
| 5,847,789 A | * | 12/1998 | Nakamura et al. ............ 349/99 |
| 6,008,871 A | * | 12/1999 | Okumara ..................... 349/61 |
| 6,130,735 A | * | 10/2000 | Hatakanan et al. ......... 349/113 |
| 6,144,432 A | * | 10/2000 | Hatannaka et al. ......... 349/119 |
| 6,204,903 B1 | * | 3/2001 | Hayashi et al. ............. 349/113 |

FOREIGN PATENT DOCUMENTS

| JP | 61260202 | 11/1986 |
| JP | 04-282613 | 7/1992 |
| JP | 07318929 | 12/1995 |
| JP | 07333598 | 12/1995 |
| JP | 08292413 | 11/1996 |
| JP | 08313901 | 11/1996 |
| JP | 10228027 | 8/1998 |

* cited by examiner

Primary Examiner—William I. Sikes
Assistant Examiner—Hoan Nguyen
(74) Attorney, Agent, or Firm—Rabin & Berdo, P.C.

(57) ABSTRACT

In a liquid crystal display device (10) according to the present invention, a retardation plate (12) and a polarizer plate (13) are stacked on one side of a liquid crystal panel (11). A second retardation plate (14) and a second polarizer plate (15) are stacked on the other side of the liquid crystal panel (11). The liquid crystal panel (11) has a pair of transparent substrates, i.e., a first transparent substrate (21) and a second transparent substrate (22), and a nematic liquid crystal layer (32) is interposed between the pair of transparent substrates. A semi-transmissive film (26) is provided on an inner surface of the second transparent substrate (22). The semi-transmissive film has both a light reflective property and a light transmissive property. When the liquid crystal display device (10) is operative in the reflective mode, light passing through the liquid crystal layer (32) is reflected on the semi-transmissive film (26). On the other hand, when the liquid crystal display device (10) is operative in the transmissive mode, internal illumination light passes through the transparent substrate (22) and the semi-transmissive film (26) into the liquid crystal layer (32).

29 Claims, 8 Drawing Sheets

LIQUID CRYSTAL DISPLAY

This application is based on Japanese Patent Applications No. 10-118939 (1998) and No. 10-244245 (1998), the contents of which are incorporated herein by reference.

BACKGROUND OF THE INVENTION

1. Field of the Invention

The present invention relates to a semi-transmissive liquid crystal display device having a semi-transmissive film. More particularly, the invention relates to a liquid crystal display device of simple matrix addressing type which is operable in a reflective mode and in a transmissive mode.

2. Description of the Prior Art

In recent years, liquid crystal display devices have widely been employed as display devices for small- and medium-size notebook personal computers and other portable information terminals and as large-scale monitors. In general, the liquid crystal display devices for the portable information terminals are of a semi-transmissive type for indoor and outdoor use.

Such a semi-transmissive liquid crystal display device is operative in a reflective mode in external illumination such as sunlight or fluorescent light, and in a transmissive mode which utilizes a backlight as internal illumination. For the operation in the reflective and transmissive modes, the semi-transmissive liquid crystal display device includes a semi-transmissive film provided in intimate contact with a polarizer plate (see Japanese Unexamined Patent Publication No. 61-260202 (1986), for example).

FIG. 1 is a schematic sectional view illustrating a conventional semi-transmissive STN liquid crystal display device 1 of simple matrix addressing type.

In FIG. 1, a reference numeral 2 denotes a liquid crystal panel. A retardation plate 3 and a polarizer plate 4 are stacked in series on one major surface of the liquid crystal panel 2 (on the upper side in FIG. 1). A polarizer plate 5 and a semi-transmissive film 6 are stacked in series on the other major surface of the liquid crystal panel 2 (on the lower side in FIG. 1), and a light guide plate 7 for backlighting is provided on the semi-transmissive film 6.

When the liquid crystal display device 1 is used in the reflective mode, the semi-transmissive film 6 functions as a reflective film. In the transmissive mode, the semi-transmissive film 6 functions as a transmissive film.

When the conventional liquid crystal display device 1 having the aforesaid construction is operative in the reflective mode, external illumination light incident on the liquid crystal panel 2 passes through the polarizer plate 4, the retardation plate 3, the liquid crystal panel 2 and the polarizer plate 5, then reflected on the semi-transmissive film 6, and passes through the polarizer plate 5, the liquid crystal panel 2, the retardation plate 3 and the polarizer plate 4. Since the light passes through the polarizer plate 5 twice, a greater amount of light is absorbed by the polarizer plate 5, resulting in reduction in the brightness of the liquid crystal display device operative in the reflective mode. On the other hand, it is not practical to invert the positional relationship of the polarizer plate 5 and the semi-transmissive film 6.

Thus, the semi-transmissive liquid crystal display device has a drawback that the brightness thereof is reduced in the reflective mode.

Another drawback is that retardation compensation is required in the transmissive mode for clear display.

To overcome the aforesaid two drawbacks, it is a principal object of the present invention to provide a semi-transmissive liquid crystal display device which is capable of high brightness display with a high contrast ratio (sufficient color compensation) in the reflective mode and in the transmissive mode.

It is another object of the invention to provide a high performance semi-transmissive liquid crystal display device which offers satisfactorily improved performance in the reflective mode and in the transmissive mode.

It is further another object of the invention to provide a semi-transmissive liquid crystal display device which features a greater viewing angle and a greater viewable area for image display.

SUMMARY OF THE INVENTION

In the liquid crystal display device according to the present invention, a retardation plate (12) and a polarizer plate (13) are stacked on one side of a liquid crystal panel (11). A second retardation plate (14) and a second polarizer plate (15) are stacked on the other side of the liquid crystal panel (11). The liquid crystal panel (11) has a pair of transparent substrates, i.e., a first transparent substrate (21) and a second transparent substrate (22), and a nematic liquid crystal layer (32) is interposed between the pair of transparent substrates. A semi-transmissive film (26 or 51) is provided on an inner surface of either one of the transparent substrates. The semi-transmissive film has both a light reflective property and a light transmissive property. When the liquid crystal display device is operative in the reflective mode, light passing through the liquid crystal layer (32) is reflected on the semi-transmissive film (26 or 51). On the other hand, when the liquid crystal display device is operative in the transmissive mode, internal illumination light passes through the transparent substrate and the semi-transmissive film into the liquid crystal layer (32).

Thus, the liquid crystal display device, which includes the semi-transmissive film provided on the inner surface of either one of the transparent substrates of the liquid crystal panel, and the retardation plate and the polarizer plate provided on each side of the liquid crystal panel, offers satisfactory display performance both in the reflective mode and in the transmissive mode.

DESCRIPTION OF THE PREFERRED EMBODIMENTS

Figure 2:
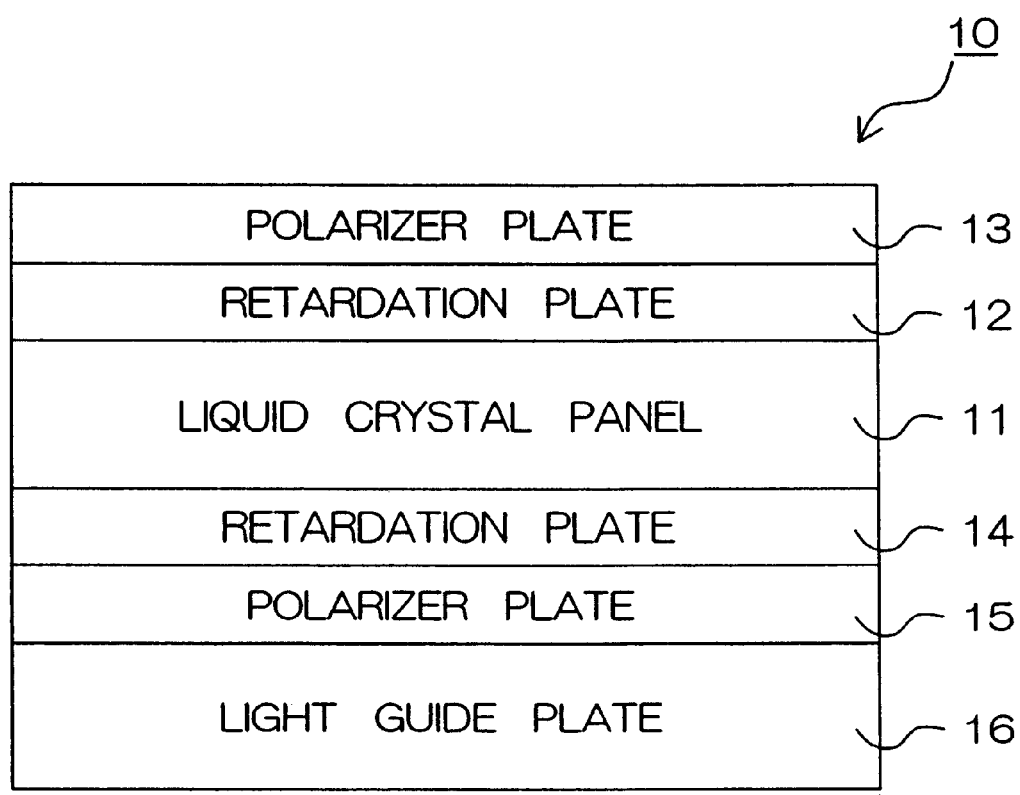
FIG. 2 is a schematic sectional view illustrating the construction of a semi-transmissive liquid crystal display device according to one embodiment of the present invention.

FIG. 2 is a schematic sectional view illustrating the construction of a semi-transmissive liquid crystal display device 10 according to one embodiment of the present invention.

In FIG. 2, a reference numeral 11 denotes a liquid crystal panel. The liquid crystal panel 11 includes a pair of glass substrates opposed to each other, and a multiplicity of transparent electrodes formed as extending parallel to each other on an inner surface of each of the glass substrates, the transparent electrodes on one of the glass substrates extending perpendicularly to the transparent electrodes on the other glass substrate. An orientation film is provide over the parallel transparent electrodes on each of the glass substrates. A nematic liquid crystal is provided between the glass substrates with molecules thereof being twisted at 180 to 270 degrees.

A retardation plate 12 such as of a polycarbonate and an iodine-based polarizer plate 13 are stacked in series on one surface of the liquid crystal panel 11 (on the upper side in FIG. 2). A retardation plate 14 such as of a polycarbonate and an iodine-based polarizer plate 15 are stacked in series on the other surface of the liquid crystal panel 11 (on the lower side in FIG. 2). These components are bonded to each other with an acrylic adhesive. Further, a light guide plate 16 such as of an acrylic resin plate for guiding illumination of light source is provided on a surface of the polarizer plate 15. Light emitted from a light source not shown is guided to the entire polarizer plate 15 through the light guide plate 16.

Figure 3:
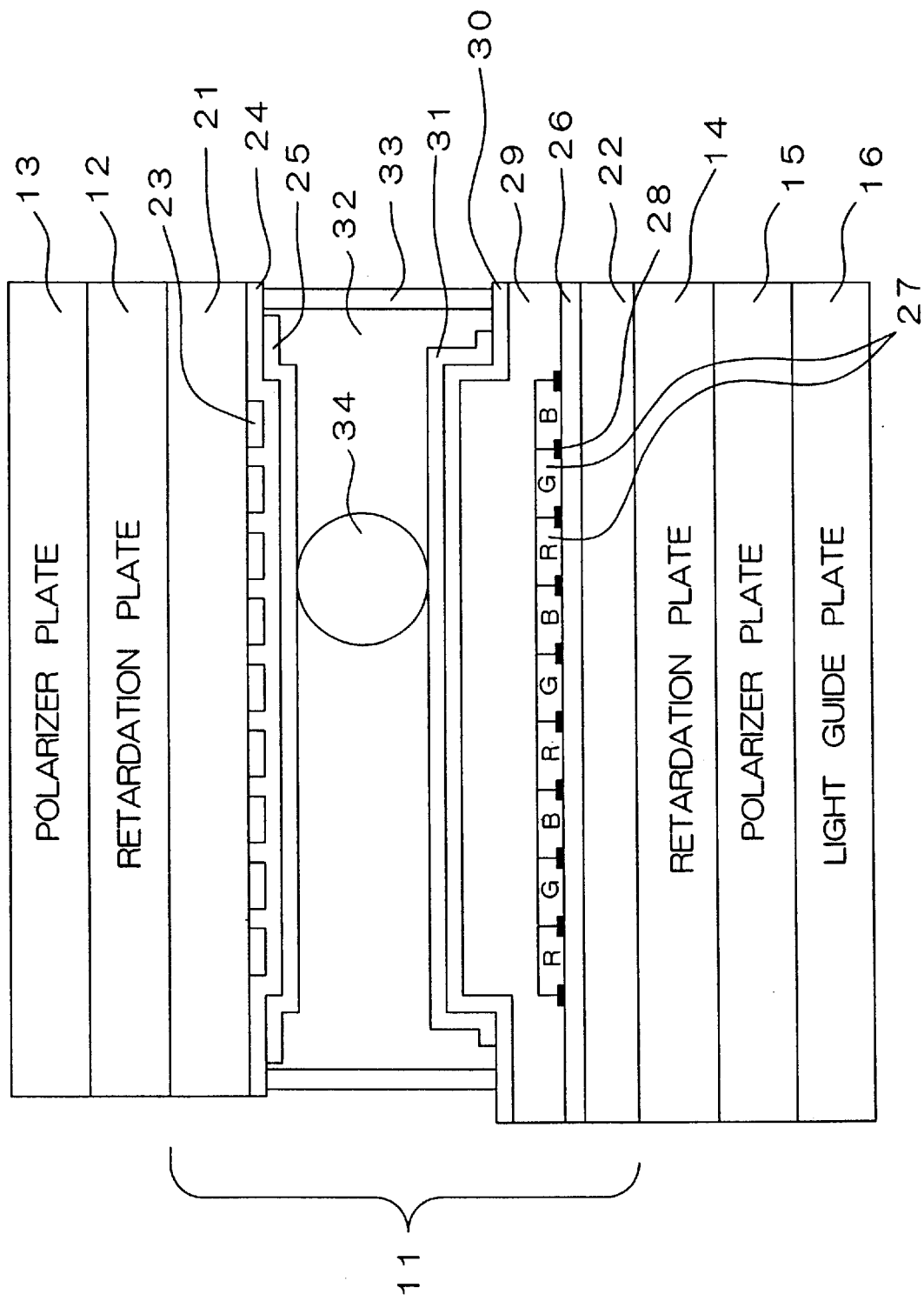
FIG. 3 is an enlarged sectional view schematically illustrating the semi-transmissive liquid crystal display device according to the embodiment of the invention.

In FIG. 2, the liquid crystal display device 10 has a display surface on the upper side thereof, so that images such as of characters and figures displayed by the liquid crystal are viewed from the upper side thereof. FIG. 3 is an enlarged sectional view of the liquid crystal display device 10 shown in FIG. 2, illustrating the liquid crystal panel 11 in greater detail on a larger scale. In FIGS. 2 and 3, the respective components are shown as each having a convenient thickness for illustration and, in reality, have different thicknesses.

Referring to FIG. 3, the liquid crystal panel 11 has a first glass substrate 21 and a second glass substrate 22 opposed to each other. The first glass substrate 21 is located on a segment side, while the second glass substrate 22 is located on a common side. A multiplicity of transparent electrodes 23 such as of ITO are provided as extending parallel to each other on an inner surface of the first glass substrate 21, and an insulation layer 24 such as of $SiO_2$ and an orientation film 25 such as of a polyimide resin unidirectionally rubbed are stacked over the transparent electrodes 23.

The provision of the isolation layer 24 may be dispensed with.

A semi-transmissive film 26 is provided on an inner surface of the glass substrate 22 on the common side. R (red), G (green) and B (blue) color filters 27 and a black matrix 28 are provided on the surface of the semi-transmissive film 26. The provision of the color filters 27 and/or the black matrix 28 can easily be achieved not by providing these components directly on the semi-transmissive film 26 but by providing an $SiO_2$ film on the semi-transmissive film 26 and then providing the color filters 27 and the black matrix 28 on the $SiO_2$ film. A set of RGB color filters 27 is provided for each pixel. The black matrix 28 which is formed of metal chromium or a photo-resist separates the respective color filters 27.

The black matrix 28 is not an essential component, so that the provision of the black matrix 28 may be dispensed with.

The semi-transmissive film 26 has both a light transmissive property and a light reflective property and, in addition, is adapted to produce no phase retardation in the light passing through the two polarizer plates 13, 15. The semi-transmissive film 26 may have a mirror-like surface or a light scattering surface.

The semi-transmissive film 26 may be composed of a metal film or a dielectric film. Where the semi-transmissive film 26 is composed of a metal film, exemplary materials for the metal film include Al, Cr, SUSs and Ag, and the film thickness is 50 to 350 Å to allow the semi-transmissive film to have both the light transmissive property and the light reflective property. In this case, the thickness of the semi-transmissive film 26 is preferably 50 to 100 Å for enhancement of the light transmissive property, and 100 to 350 Å for enhancement of the light reflective property.

Where the semi-transmissive film 26 is composed of a dielectric film, the dielectric film may be a $TiO_2$ film of a high refractive index or a laminated film comprising $TiO_2$ films of a high refractive index and $SiO_2$ films of a low refractive index stacked in an alternating relation. The semi-transmissive film 26 composed of the dielectric film preferably has a thickness of 100 to 10000 Å.

The formation of the semi-transmissive film 26 on the inner surface of the transparent glass substrate 22 may be achieved, for example, by a sputtering method. The sputtering method is advantageous in that a high quality film can stably be formed. The semi-transmissive film 26 of the metal film can be formed at lower costs because a single metal material is used.

The formation of the color filters 27 may be achieved by a pigment dispersing method. More specifically, pigment-dispersed photo-resists are applied on the semi-transmissive film 26 and the color filters 27 are formed in desired positions by a photolithography method.

An overcoat layer 29 of an acrylic resin is provided over upper surfaces of the color filters 27, and a multiplicity of transparent electrodes 30 such as of ITO are provided as extending parallel to each other on an upper surface of the overcoat layer 29. The transparent electrodes 30 extend perpendicularly to the transparent electrodes 23 provided on the segment side. An orientation film 31 of a polyimide resin unidirectionally rubbed is provided over an upper surface of the transparent electrodes 30.

The first glass substrate 21 on the segment side having the transparent electrodes 23, the insulation layer 24 and the orientation film 25 is disposed as opposed to the second glass substrate 22 on the common side having the semi-transparent film 26, the color filters 27, the black matrix 28, the overcoat layer 29, the transparent electrodes 30 and the orientation film 31 with the orientation films 25 and 31 being spaced a predetermined distance. A chiral nematic liquid crystal with molecules thereof twisted at an angle of 200 to 270 degrees is filled in a space defined between the orientation films 25 and 31 to form a liquid crystal layer 32, and the periphery of the glass substrates 21, 22 is sealed with a sealant 33. Further, transparent spacers 34 (e.g., 2000 spacers/10 $mm^2$) are dispersed in the liquid crystal layer 32 to allow the liquid crystal layer 32 to have a uniform thickness.

In FIG. 3, the provision of the insulation layer 24 and the overcoat layer 29 may be dispensed with.

Where the liquid crystal display device 10 according to this embodiment is operative in the reflective mode, external illumination light such as sunlight or fluorescent light passes through the polarizer plate 13 on the display surface side, the retardation plate 12 and the liquid crystal panel 11. In the liquid crystal panel 11, the light passes through the first glass substrate 21, the orientation film 25, the liquid crystal layer 32 and the orientation film 31, and reflected on the semi-transmissive film 26 before the second glass substrate 22. The reflected light passes through the liquid crystal layer 32, the retardation plate 12 and the polarizer plate 13, and exits out of the liquid crystal display device to the display surface side. In the reflective mode, small attenuation of the incident light is not suppressed to ensure clear display by the liquid crystal layer 32.

Where the liquid crystal display device 10 is operative in the transmissive mode, illumination light guided from the light source into the light guide plate 16 passes through the polarizer plate 15 and the retardation plate 14 into the liquid crystal panel 11. The light passes through the semi-transmissive film 26, the color filters 27, the orientation film 31, the liquid crystal layer 32, the orientation film 25 and the like, and further passes through the retardation plate 12 and the polarizer plate 13 to exit out of the liquid crystal display device to the display surface side.

After the light guided through the light guide plate 16 passes through the polarizer plate 15, the polarization state of the light is changed by the retardation plate 14. Therefore, the liquid crystal display device is properly operable in the transmissive mode even with the liquid crystal layer 32 of the liquid crystal panel being optimally conditioned for the reflective mode. More specifically, the retardation plate 14 is conditioned so that the light emitted from the backlight has the same polarization state as the light reflected on the semi-transmissive film 26 in the reflective mode.

Thus, the liquid crystal display device 10 ensures stable and clear color display both in the reflective mode and in the transmissive mode.

Since the semi-transmissive film 26 is provided on the inner surface of the second glass substrate 22, the external illumination light is reflected on the semi-transmissive film 26 before entering the glass substrate 22 when the liquid crystal display device is operative in the reflective mode. Therefore, the liquid crystal display device is free from doubling of display images which may otherwise occur due to the presence of the glass substrate 22. Since light incident on a pixel including a set of RGB color filters is reflected back through the same pixel, reduction in the brightness and color purity of the display device is prevented.

Figure 4:
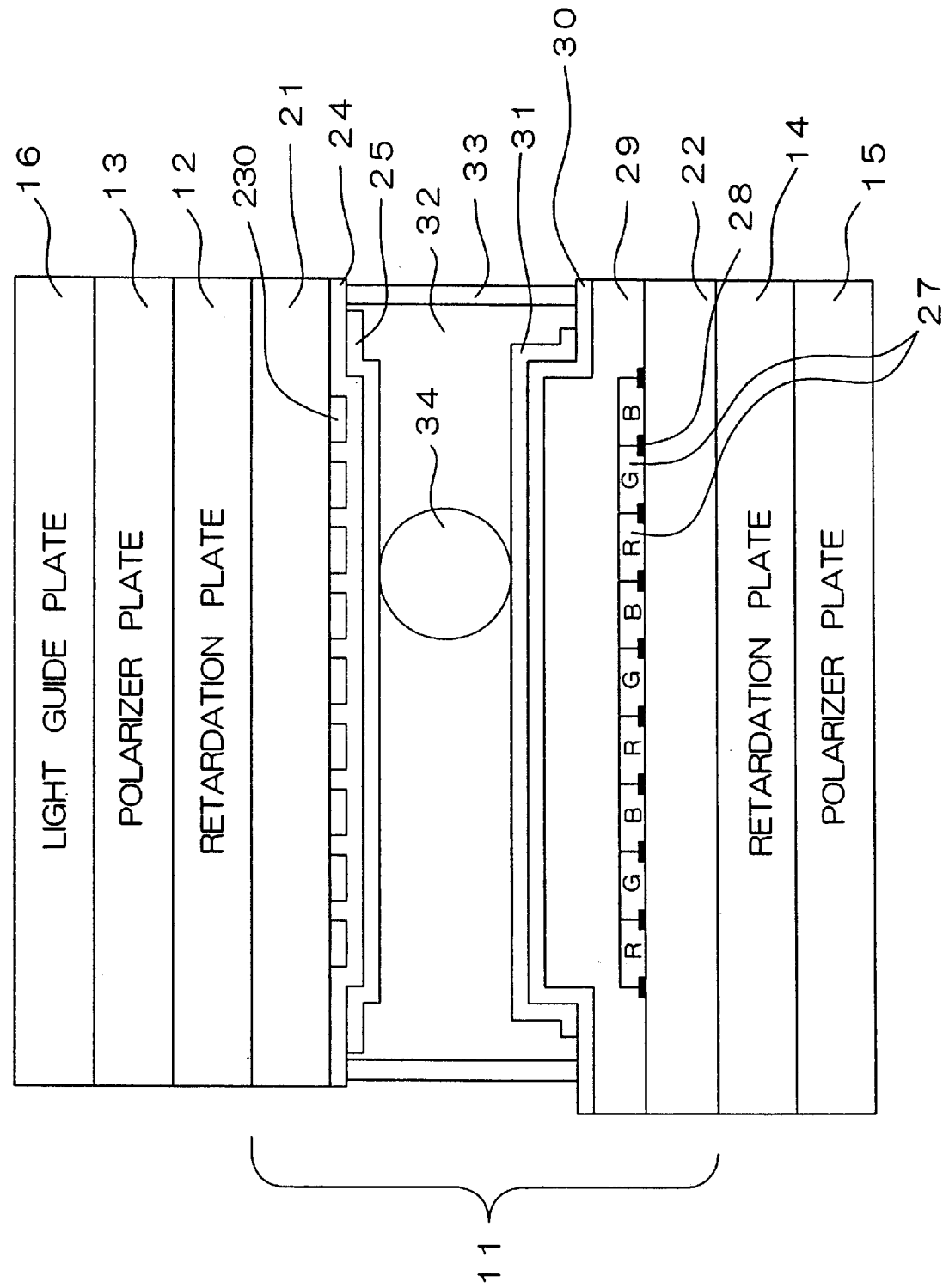
FIG. 4 is an enlarged sectional view schematically illustrating the construction of a liquid crystal display device according to another embodiment of the invention.

FIG. 4 is a sectional view schematically illustrating the construction of a liquid crystal display device 40 according to another embodiment of the invention. In the liquid crystal display device 40 shown in FIG. 4, the components identical to or corresponding to the components of the liquid crystal display device 10 shown in FIG. 3 are denoted by the same reference characters, and no explanation will be given thereto.

In the liquid crystal display device 40, no semi-transmissive film is provided on the inner surface of the second glass substrate 22 on the common side but, instead, transparent electrodes 230 provided on the inner surface of the first glass substrate 21 on the segment side are each composed of a semi-transmissive film. The transparent electrodes 230 of the semi-transmissive film are formed of a metal. Thus, the transparent electrodes 230 have a semi-transmissive property.

In the liquid crystal display device 40, the light guide plate 16 for guiding the light from the light source is provided not on the surface of the polarizer plate 15 but on the surface of the polarizer plate 13. Accordingly, the surface of the polarizer plate 15 (on the lower side in FIG. 4) serves as a display surface of the liquid crystal display device 40.

Where the liquid crystal display device 40 is operative in the reflective mode, the light incident from the polarizer plate 15 passes through the retardation plate 14 into the liquid crystal panel 11. The light entering the liquid crystal panel 11 passes through the liquid crystal layer 32, and is then reflected on the transparent electrodes 230 on the inner surface of the first glass substrate 21. The reflected light passes through the liquid crystal panel 11, the retardation plate 14 and the polarizer plate 15 and exits out of the liquid crystal display device to the display surface side.

Where the liquid crystal display device 40 is operative in the transmissive mode, the light guided from the light source through the light guide plate 16 passes through the polarizer plate 13 and the retardation plate 12 into the liquid crystal panel 11. The light passes through the liquid crystal panel 11, the retardation plate 14 and the polarizer plate 15, and exits out of the liquid crystal display device to the display surface side.

The liquid crystal display device 40 realizes excellent liquid crystal display without reduction in brightness in the reflective mode. The liquid crystal panel conditioned for the reflective mode can be used as it is in the transmissive mode. Therefore, the liquid crystal display device ensures stable and clear color display both in the reflective mode and in the transmissive mode. Further, the liquid crystal display device is free from doubling of display images.

Figure 5:
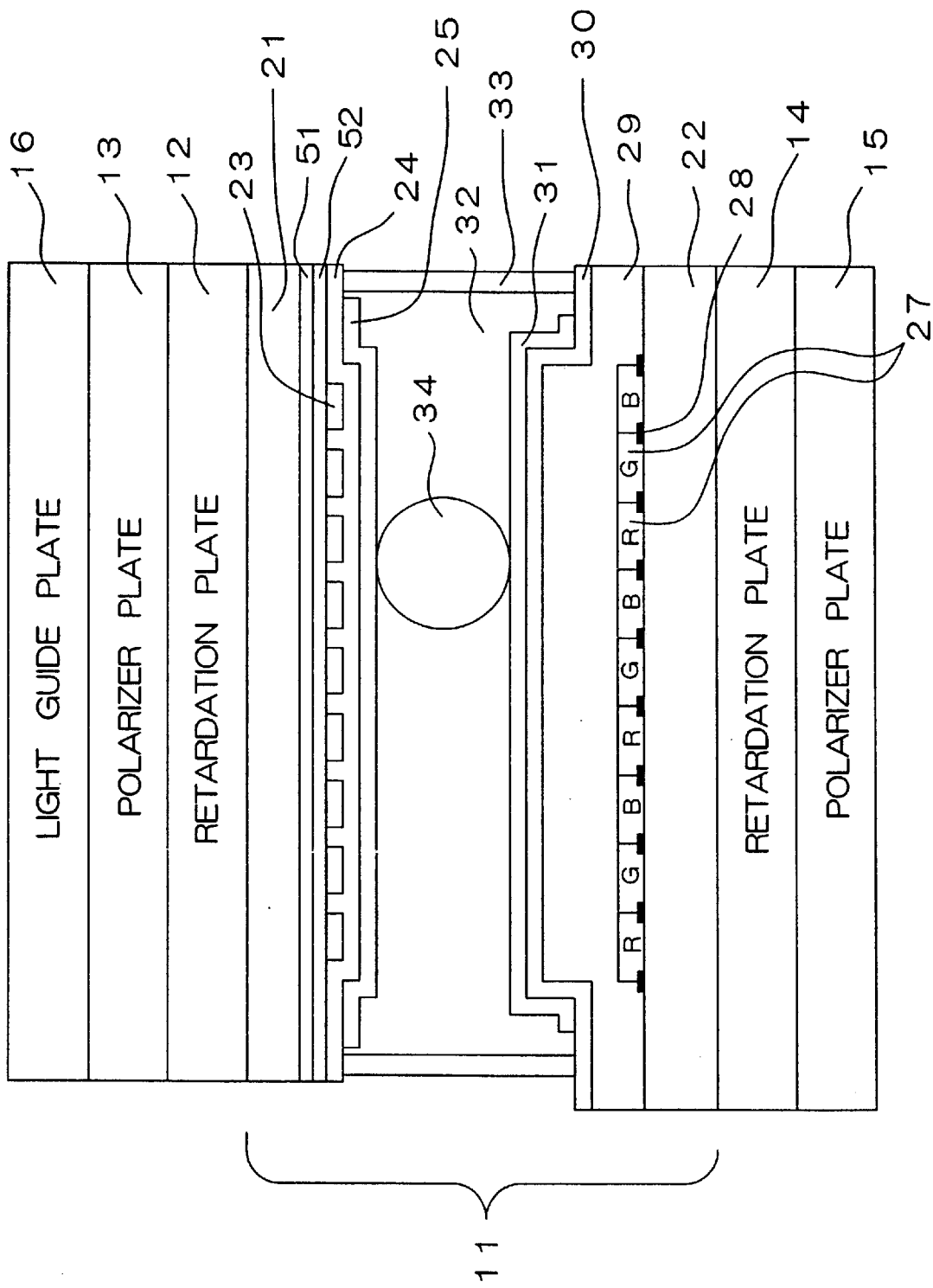
FIG. 5 is an enlarged sectional view schematically illustrating the construction of a liquid crystal display device according to further another embodiment of the invention.

FIG. 5 is a sectional view schematically illustrating the construction of a liquid crystal display device 50 according to further another embodiment of the invention. In FIG. 5, the components identical to or corresponding to the components shown in FIGS. 3 and 4 are denoted by the same reference characters, and no explanation will be given thereto.

Like the liquid crystal display device 40 shown in FIG. 4, the liquid crystal display device 50 shown in FIG. 5 has a display surface on the side of the polarizer plate 15, so that displayed information can be viewed from the display surface side. Therefore, the light guide plate 16 for backlighting is provided on a surface of the polarizer plate 13 (on the upper side in FIG. 5).

In the liquid crystal display device 50, a semi-transmissive film 51 composed of a metal film or a dielectric film is provided on the inner surface of the first glass substrate 21 on the segment side. An overcoat layer 52 such as of SiO (silica) is provided on the semi-transmissive film 51. The transparent electrodes 23 are provided on the overcoat layer 52. The provision of the overcoat layer 52 may be dispensed with.

Unlike the liquid crystal display device 10 (FIG. 3), the liquid crystal display device 50 does not have the semi-transmissive film 26 on the inner surface of the second glass substrate 22 on the common side.

Where the liquid crystal display device 50 is operative in the reflective mode, external illumination light passes through the polarizer plate 15 and the retardation plate 14 into the liquid crystal panel 11. The light is reflected on the semi-transmissive film 51 provided on the inner surface of the first glass substrate 21. The reflected light passes through the liquid crystal panel 11, the retardation plate 14 and the polarizer plate 15, and exits out of the liquid crystal display device to the display surface side.

Where the liquid crystal display device 50 is operative in the transmissive mode, the light guided through the light guide plate 16 passes through the polarizer plate 13 and the retardation plate 12, so that the polarization state of the light is changed. The light passes through the liquid crystal panel 11 and then through the retardation plate 14 and the polarizer plate 15, and exits out of the liquid crystal display device to the display surface side.

Therefore, the liquid crystal display device 50 ensures stable and clear color display both in the reflective mode and in the transmissive mode, like the liquid crystal display device 40 described with reference to FIG. 4. Further, the liquid crystal display device 50 is free from doubling of display images which may otherwise occur due to the presence of the glass substrate 21 on the segment side.

In the liquid crystal display device 10 shown in FIG. 3, a light scattering layer 35 may be provided between an outer surface of the first glass substrate 21 of the liquid crystal panel 11 and the retardation plate 12. Similarly, in the liquid crystal display device 40 shown in FIG. 4 or the liquid crystal display device 50 shown in FIG. 5, a light scattering layer 35 may be provided between the second glass substrate 22 and the retardation plate 14.

Figure 6:
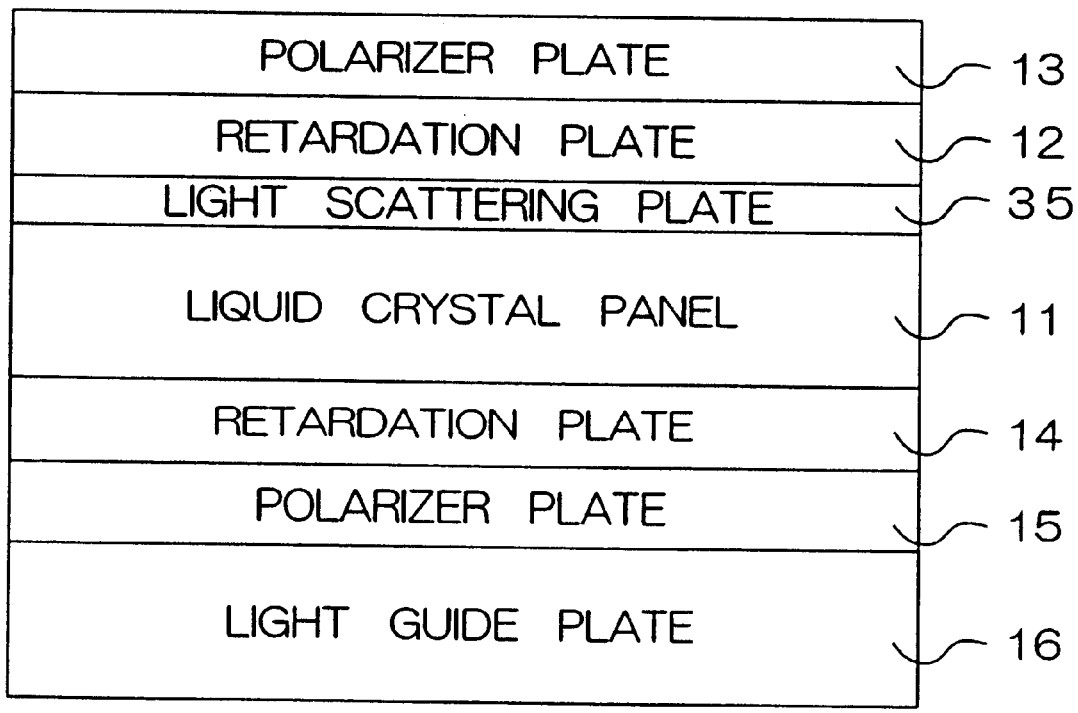
FIG. 6 is a diagram schematically illustrating the construction of the liquid crystal display device 10 further provided light a scattering layer.
Figure 7:
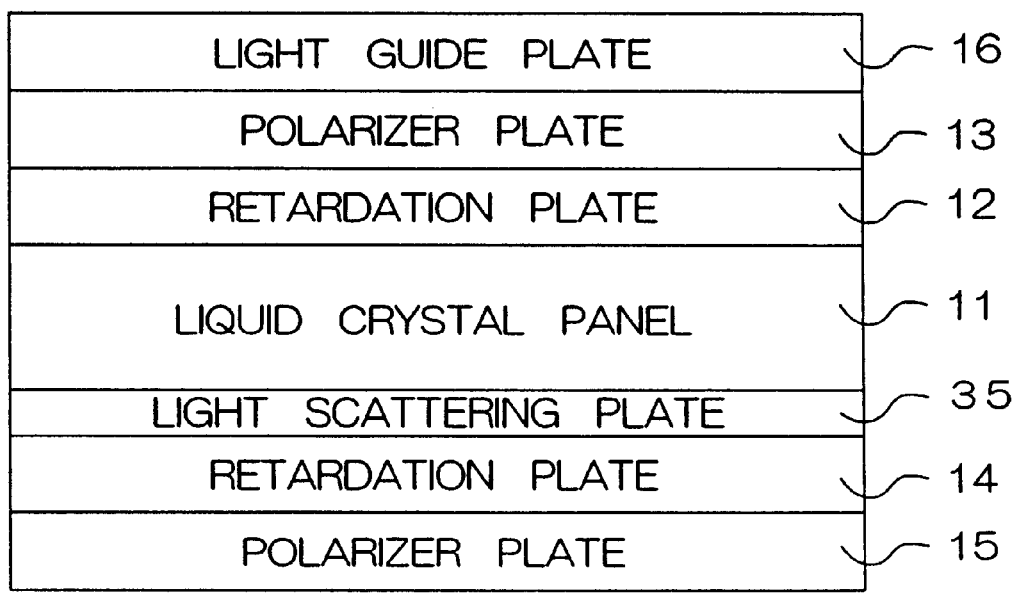
FIG. 7 is a diagram schematically illustrating the construction of the liquid crystal display device 40 or 50 further provided with a light scattering layer.

FIG. 6 is a diagram schematically illustrating the construction of the liquid crystal display device 10 provided with the light scattering layer 35, and FIG. 7 is a diagram schematically illustrating the construction of the liquid crystal display device 40 or 50 provided with the light scattering layer 35.

Usable as the light scattering layer 35 is, for example, an IDS (internal diffusion sheet) available from Dainippon Printing Co., Ltd. The IDS comprises a resin sheet and beads and the like dispersed therein.

Alternatively, a planar plate having light scattering undulations formed on a surface thereof may be used as the light scattering layer 35.

The provision of the light scattering layer 35 between the liquid crystal panel and the retardation plate allows the liquid crystal display devices to have a greater viewing angle and a greater viewable area for image display. This is because the light reflected on the semi-transmissive film is scattered by the light scattering layer 35 in directions other than a main reflection direction when the liquid crystal display devices are operative in the reflective mode.

An explanation will be given to optimal conditions of the retardation plate 12 or 14 where the light scattering layer 35 is provided between the liquid crystal panel 11 and the retardation plate 12 in the liquid crystal display device 10, or between the liquid crystal panel 11 and the retardation plate 14 in the liquid crystal display device 40 or 50.

Figure 8:
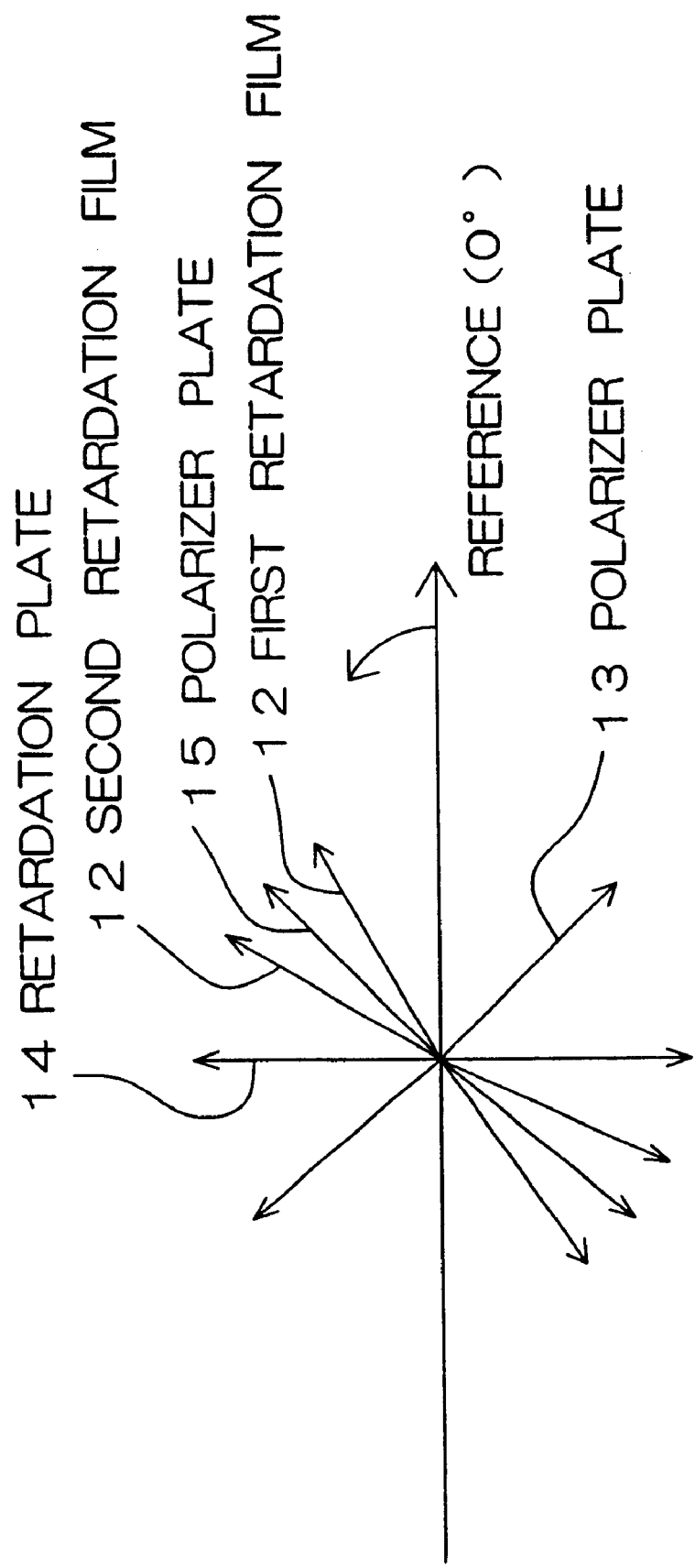
FIG. 8 is a graph showing preferable light reflection conditions and light transmission conditions in the liquid crystal display device 10, particularly on the basis of the liquid crystal molecular orientation in a liquid crystal layer, the extension axes of retardation plates and the absorption axes of polarizer plates.

FIG. 8 is a graph showing preferable light transmission conditions in the liquid crystal display device 10, particularly on the basis of the liquid crystal molecular orientation in the liquid crystal layer 21, the extension axes of the retardation plates and the absorption axes of polarizer plates.

It is herein assumed that the liquid crystal layer 32 in the liquid crystal display device 10 has a twist angle of 250±20 degrees and an optical path difference Δnd of 850±50 nm. In this case, the retardation plate 12 comprises a first retardation film provided on the side of the polarizer plate 13 and a second detardation film provided on the side of the glass substrate 21. In FIG. 8, extension axes of the retardation plates 12 and 14 and absorption axes of the polarizer plates 13 and 15 each form an angle which is measured counterclockwise with respect to a mean rubbing direction of the orientation films 25 and 31 as seen from the display surface side.

To obtain the characteristic relationship shown in FIG. 8, it is preferred that: the first detardation film has an optical path difference Δnd of 425±20 nm and an extension axis angle of 25±10 degrees; the second detardation film has an optical path difference Δnd of 425±20 nm and an extension axis angle of 55±10 degrees; the polarizer plate 13 has an absorption axis angle of 137±10 degrees; the retardation plate 14 has an optical path difference Δnd of 140±20 nm and an extension axis angle of 90±10 degrees; and the polarizer plate 15 has an absorption axis angle of 45±10 degrees.

The liquid crystal display device 10 satisfying the characteristic relationship shown in FIG. 8 exhibits a high brightness and a high contrast ratio (satisfactory color compensation) in the reflective mode and also ensures a satisfactory color compensation in the transmissive mode.

Thus, the liquid crystal display device 10 satisfying the characteristic relationship shown in FIG. 8 ensures high chromaticity display both in the reflective mode and in the transmissive mode.

EXAMPLES 1-1 and 1-2

Figure 1:
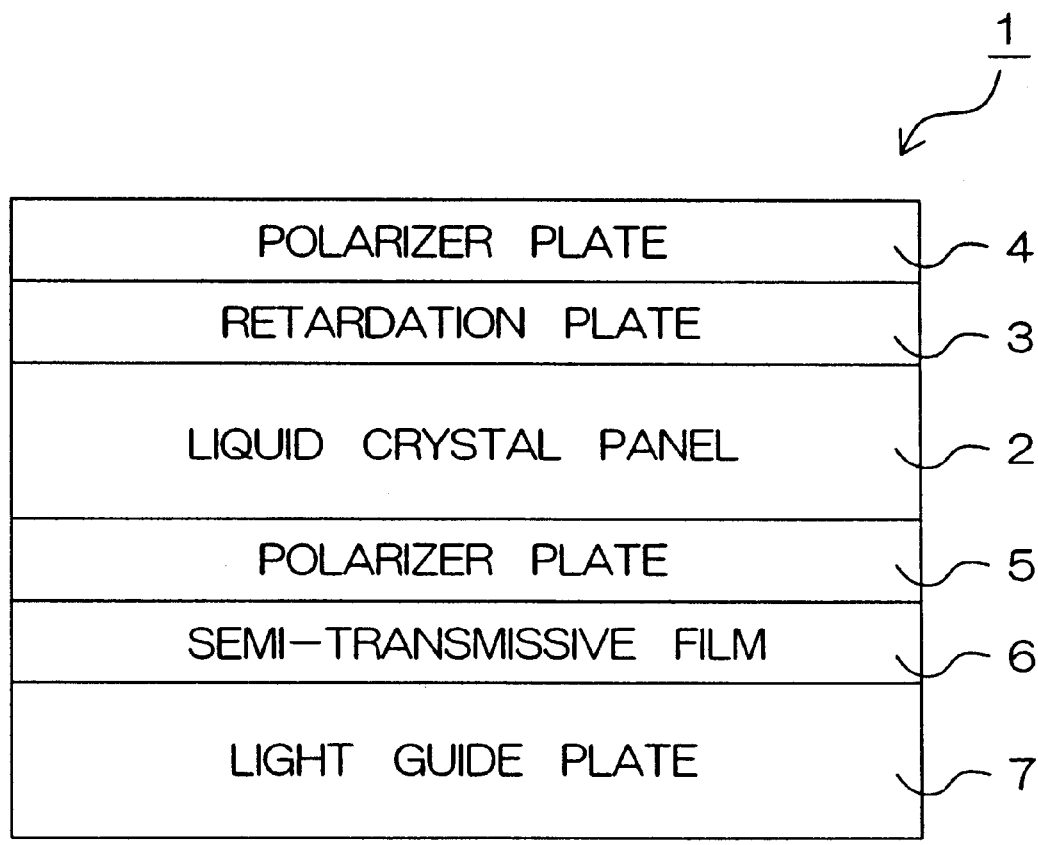
FIG. 1 is a schematic sectional view illustrating a conventional semi-transmissive STN liquid crystal display device of simple matrix addressing type.

The liquid crystal display device 10 shown in FIG. 3 and the liquid crystal display device 40 shown in FIG. 4 were operated in the transmissive mode and in the reflective mode, and the brightness levels thereof were measured. The results are shown in Table 1. In Table 1, EXAMPLE 1-1 is the liquid crystal display device 10, and EXAMPLE 1-2 is the liquid crystal display device 40. The conventional liquid crystal display device 1 shown in FIG. 1 was used as COMPARATIVE EXAMPLE.

For emeasurement of the chromaticity and brightness, Minolta's CS-100 was used. When the liquid crystal display devices were operated in the transmissive mode, the same backlight having a predetermined luminance was used. When the liquid crystal display devices were operated in the reflective mode, the same light source was used to illuminate the display surfaces of the liquid crystal display devices at a predetermined angle. The chromaticity and brightness of each of the liquid crystal display devices were measured in the direction of the normal to the display surface.

TABLE 1

| | Mode | Bright-ness | Chromaticity | | |
| --- | --- | --- | --- | --- | --- |
| | | | R | G | B |
| EXAMPLE 1-1 | Transmissive | 1.10 | 0.40, 0.30 | 0.29, 0.40 | 0.25, 0.25 |
| | Reflective | 2.00 | 0.42, 0.33 | 0.29, 0.41 | 0.23, 0.24 |
| EXAMPLE 1-2 | Transmissive | 1.30 | 0.40, 0.30 | 0.29, 0.40 | 0.25, 0.25 |
| | Reflective | 2.30 | 0.42, 0.33 | 0.29, 0.41 | 0.23, 0.24 |
| COMP. EXAMPLE | Transmissive | 1.00 | 0.37, 0.30 | 0.29, 0.34 | 0.28, 0.27 |
| | Reflective | 1.00 | 0.40, 0.33 | 0.31, 0.36 | 0.24, 0.25 |

The brightness levels of the display devices of EXAMPLES 1-1 and 1-2 measured in the transmissive and reflective modes are expressed as values relative to the brightness levels (defined as 1.00) of the display device of COMPARATIVE EXAMPLE measured in the transmissive and reflective modes.

As apparent from Table 1, the liquid crystal display device 10 of EXAMPLE 1-1 and the liquid crystal display device

40 of EXAMPLE 1-2 each exhibited higher levels of brightness both in the transmissive mode and in the reflective mode. Particularly, the liquid crystal display device 40 of EXAMPLE 1-2 exhibited much higher brightness levels than the liquid crystal display device 10 of EXAMPLE 1-1 in the transmissive and reflective modes.

Further, the brightness levels of the liquid crystal display device 10 provided with the light scattering layer 35 as shown in FIG. 6 and the liquid crystal display device 40 provided with the light scattering layer 35 as shown in FIG. 7 were measured in the transmissive and reflective modes. The results are that the display devices 10, 40 exhibited substantially the same brightness levels in the transmissive mode, and the brightness levels thereof measured in the normal direction in the reflective mode were increased because the light was scattered in directions other than the regular reflection direction.

EXAMPLES 2-1 to 2-9

Liquid crystal display devices of EXAMPLES 2-1 to 2-9 were fabricated which had the same construction as the liquid crystal display device 10 shown in FIGS. 2 and 3 and respectively included semi-transmissive Al metal films 26 having different thicknesses, and the light transmission and light reflection properties thereof were determined. The results are shown in Table 2.

TABLE 2

|  | Thickness (Å) | Reflectance (%) | Transmittance (%) |
|---|---|---|---|
| EXAMPLE 2-1 | 45 | 3.0 | 6.9 |
| EXAMPLE 2-2 | 50 | 3.5 | 6.5 |
| EXAMPLE 2-3 | 90 | 4.7 | 5.0 |
| EXAMPLE 2-4 | 110 | 6.8 | 2.9 |
| EXAMPLE 2-5 | 150 | 7.7 | 1.6 |
| EXAMPLE 2-6 | 200 | 8.5 | 0.8 |
| EXAMPLE 2-7 | 300 | 9.2 | 0.6 |
| EXAMPLE 2-8 | 340 | 9.3 | 0.4 |
| EXAMPLE 2-9 | 360 | 9.4 | 0.1 |

Otsuka Electronics' measuring device LCD-7000 was used for the measurement of the transmittance. For each of the display devices, light was directed onto the polarizer plate 15 in the direction of the normal thereto with the light guide plate 16 removed, and the light exiting out of the device in the normal direction was sensed on the surface of the polarizer plate 13.

The reflectance of each of the display devices was measured by means of the same measuring device. For the measurement of the reflectance, light was directed onto the surface to the polarizer plate 13 at a predetermined angle, and the reflected light was sensed. A 10.4"VGA (640×480 pixels) was employed as the liquid crystal panel 11 in each of the display devices for the measurement of the transmittance and the reflectance.

As apparent from Table 2, EXAMPLES 2-2 to 2-8 were excellent in the light transmission and light reflection properties. Particularly, EXAMPLES 2-2 and 2-3 each had a notably high transmittance, and EXAMPLES 2-4 to 2-8 each had a notably high reflectance.

The inventor of the present invention experimentally confirmed that, even where semi-transmissive films 26 composed of Cr, SUS and Ag metal films are employed, a film thickness of 50 to 350 Å provides for satisfactory light transmission and light reflection properties with some variations in the transmittance and reflectance. Particularly, a film thickness of 50 to 100 Å provides for an excellent light transmission property, and a film thickness of 100 to 350 Å provides for an excellent light reflection property.

Although the present invention is applied to the simple matrix STN color liquid crystal display device in the embodiments described above, the present invention is applicable to simple matrix STN monochrome liquid crystal display devices. Further, the invention is applicable to twisted nematic liquid crystal display devices such as simple matrix TN liquid crystal display devices and active matrix TN liquid crystal display devices, and bistable twisted nematic type simple matrix monochrome or color liquid crystal display devices.

It should be understood that various modifications may be made to the embodiments within the spirit and scope of the invention as defined in the following claims.

What is claimed is:

1. A liquid crystal display device comprising:
   a liquid crystal panel having a first transparent substrate and a second transparent substrate in pair spaced a predetermined distance from each other in an opposed relation, transparent electrodes and an orientation film provided on an opposed inner surface of each of the first and second transparent substrates, and a nematic liquid crystal provided between the first and second transparent substrates;
   a first retardation plate provided on an outer surface of the first transparent substrate of the liquid crystal panel;
   a first polarizer plate provided on the first retardation plate;
   a second retardation plate provided on an outer surface of the second transparent substrate of the liquid crystal panel;
   a second polarizer plate provided on the second retardation plate; and
   a semi-transmissive film provided on the inner surface of the first transparent substrate and having both a light transmissive property and a light reflective property;
   wherein backlight emitting means is provided on the first polarizer plate for internal illumination;
   wherein an outer surface of the second polarizer plate serves as a display surface; and
   wherein the first retardation plate is conditioned to change the polarization state of the light emitted from the backlight used in the transmissive mode to be the same polarization state as the light reflected from the semi-transmissive film in the reflective mode.

2. A liquid crystal display device as set forth in claim 1, wherein the transparent electrodes provided on the inner surface of the first transparent substrate are each comprised of a semi-transmissive film strip so as to function as the semi-transmissive film.

3. A liquid crystal display device as set forth in claim 2, further comprising a light scattering layer provided between the second transparent substrate and the second retardation plate.

4. A liquid crystal display device as set forth in claim 1, further comprising a light scattering layer provided between the second transparent substrate and the second retardation plate.

5. The liquid crystal display device according to claim 1, wherein the semi-transmissive film comprises a metal film.

6. The liquid crystal display device according to claim 1, wherein the semi-transmissive film comprises the plurality of transparent electrodes provided on the inner surface of the first transparent substrate, wherein the plurality of transparent electrodes are composed of a semi-transmissive metal film.

7. The liquid crystal display device according to claim 6, wherein the metal film comprises a material selected from the group including: Al, Cr, SUSs, and Ag; and wherein the metal film has a thickness in the range of 50 to 350 angstroms.

8. The liquid crystal display device according to claim 1, wherein the semi-transmissive film comprises a dielectric film.

9. The liquid crystal display device according to claim 8, wherein the dielectric film comprises one of a $TiO_2$ film of a high refractive index, or a laminated film including alternating $TiO_2$ films of high refractive index and $SiO_2$ films of low refractive index.

10. The liquid crystal display device according to claim 9, wherein the dielectric film has a thickness in the range of 100 to 10,000 angstroms.

11. The liquid crystal display device according to claim 1, wherein the semi-transmissive film is formed by a sputtering method.

12. The liquid crystal display device according to claim 1, wherein an insulating layer is provided on the semi-transparent film.

13. The liquid crystal display device according to claim 12, wherein the insulating layer comprises a silicon oxide layer.

14. The liquid crystal display device according to claim 1, wherein an overcoating layer is provided on the semi-transmissive film.

15. The liquid crystal display device according to claim 14, wherein the overcoating layer comprises acrylic resin.

16. The liquid crystal display device according to claim 14, wherein an insulating layer is provided on the overcoating layer.

17. The liquid crystal display device according to claim 16, wherein the insulating layer comprises a silicon oxide layer.

18. The liquid crystal display device according to claim 1, wherein an overcoating layer is provided on the second transparent substrate.

19. The liquid crystal display device according to claim 18, wherein the overcoating layer comprises acrylic resin.

20. The liquid crystal display device according to claim 1, wherein a plurality of red, green and blue filters are provided on the second transparent substrate.

21. The liquid crystal display device according to claim 20, wherein the plurality of color filters are formed by a pigment dispersing method, using pigment-dispersed photoresists and photolithography.

22. The liquid crystal display device according to claim 1, wherein a plurality of red, green and blue filters, and a black matrix separating the respective red, green and blue filters are provided on the second transparent substrate.

23. The liquid crystal display device according to claim 1, wherein each of the orientation films comprise a polymide resin unidirectionally rubbed.

24. The liquid crystal display device according to claim 1, wherein a plurality of transparent spacers are provided in the nematic liquid crystal.

25. The liquid crystal display device according to claim 1, wherein the nematic liquid crystal has molecules thereof twisted at an angle in the range of approximately 200 to 270 degrees.

26. A liquid crystal display device comprising:

a liquid crystal panel having a first transparent substrate and a second transparent substrate in pair spaced a predetermined distance from each other in an opposed relation, transparent electrodes and an orientation film provided on an opposed inner surface of each of the first and second transparent substrates, and a nematic liquid crystal provided between the first and second transparent substrates;

a first retardation plate provided on an outer surface of the first transparent substrate of the liquid crystal panel;

a first polarizer plate provided on the first retardation plate;

a second retardation plate provided on an outer surface of the second transparent substrate of the liquid crystal panel;

a second polarizer plate provided on the second retardation plate; and a semi-transmissive film provided on the inner surface of the second transparent substrate and having both a light transmissive property and a light reflective property;

wherein backlight emitting means is provided on the second polarizer plate for internal illumination;

wherein an outer surface of the first polarizer plate serves as a display surface; and wherein the second retardation plate is conditioned to change the polarization state of the light emitted from the backlight used in the transmissive mode to be the same polarization state as the light reflected from the semi-transmissive film in the reflective mode.

27. A liquid crystal display device, comprising:

a liquid crystal panel having a first transparent substrate and a second transparent substrate in pair spaced a predetermined distance from each other in an opposed relation, transparent electrodes and an orientation film provided on an opposed inner surface of each of the first and second transparent substrates, and a nematic liquid crystal provided between the first and second transparent substrates;

a first retardation plate provided on an outer surface of the first transparent substrate of the liquid crystal panel;

a first polarizer plate provided on the first retardation plate;

a second retardation plate provided on an outer surface of the second transparent substrate of the liquid crystal panel;

a second polarizer plate provided on the second retardation plate; and a semi-transmissive film provided on the inner surface of the first transparent substrate and having both a light transmissive property and a light reflective property;

wherein backlight emitting means is provided on the first polarizer plate for internals illumination;

wherein an outer surface of the second polarizer plate serves as a display surface;

wherein the transparent electrodes provided on the inner surface of the first transparent substrate are each comprised of a semi-transmissive film strip so as to function as the semi-transmissive film;

further comprising a light scattering layer provided between the second transparent substrate and the second retardation plate; and wherein the second retardation plate is of a double layer structure comprising two films which are equal in optical path difference but different in extension axis direction.

28. A liquid crystal display device, comprising:

a liquid crystal panel having a first transparent substrate and a second transparent substrate in pair spaced a predetermined distance from each other in an opposed relation, transparent electrodes and an orientation film provided on an opposed inner surface of each of the first and second transparent substrates, and a nematic liquid crystal provided between the first and second transparent substrates;

a first retardation plate provided on an outer surface of the first transparent substrate of the liquid crystal panel;

a first polarizer plate provided on the first retardation plate;

a second retardation plate provided on an outer surface of the second transparent substrate of the liquid crystal panel;

a second polarizer plate provided on the second retardation plate; and a semi-transmissive film provided on the inner surface of the first transparent substrate and having both a light transmissive property and a light reflective property;

wherein backlight emitting means is provided on the first polarizer plate for internal illumination;

wherein an outer surface of the second polarizer plate serves as a display surface;

further comprising a light scattering layer provided between the second transparent substrate and the second retardation plate; and wherein the second retardation plate is of a double layer structure comprising two films which are equal in optical path difference but different in extension axis direction.

29. A liquid crystal display device, comprising:

a liquid crystal panel having a first transparent substrate and a second transparent substrate in pair spaced a predetermined distance from each other in an opposed relation, transparent electrodes and an orientation film provided on an opposed inner surface of each of the first and second transparent substrates, and a nematic liquid crystal provided between the first and second transparent substrates;

a first retardation plate provided on an outer surface of the first transparent substrate of the liquid crystal panel;

a first polarizer plate provided on the first retardation plate;

a second retardation plate provided on an outer surface of the second transparent substrate of the liquid crystal panel;

a second polarizer plate provided on the second retardation plate; and a semi-transmissive film provided on the inner surface of the second transparent substrate and having both a light transmissive property and a light reflective property;

wherein backlight emitting means is provided on the second polarizer plate for internal illumination, wherein an outer surface of the first polarizer plate serves as a display surface;

further comprising a light scattering layer provided between the first transparent substrate and the first retardation plate; and wherein the first retardation plate is of a double layer structure comprising two films which are equal in optical path difference but different in extension axis direction.

* * * * *